United States Patent
Kato et al.

(10) Patent No.: US 11,181,067 B1
(45) Date of Patent: Nov. 23, 2021

(54) INJECTION CONTROL DEVICE

(71) Applicant: DENSO CORPORATION, Kariya (JP)

(72) Inventors: Kosuke Kato, Kariya (JP); Yasumasa Ishikawa, Kariya (JP); Yohei Suganuma, Kariya (JP); Masashi Inaba, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/333,088

(22) Filed: May 28, 2021

(30) Foreign Application Priority Data

Jun. 29, 2020 (JP) .............................. JP2020-111599

(51) Int. Cl.
*F02D 41/20* (2006.01)
*F02D 41/38* (2006.01)
*F02D 41/22* (2006.01)
*F02D 41/14* (2006.01)
*F02D 41/26* (2006.01)

(52) U.S. Cl.
CPC ......... *F02D 41/38* (2013.01); *F02D 41/1454* (2013.01); *F02D 41/20* (2013.01); *F02D 41/221* (2013.01); *F02D 41/26* (2013.01); *F02D 2041/2013* (2013.01); *F02D 2041/2027* (2013.01); *F02D 2041/2034* (2013.01); *F02D 2041/2041* (2013.01); *F02D 2041/2058* (2013.01); *F02D 2041/224* (2013.01); *F02D 2200/023* (2013.01)

(58) Field of Classification Search
CPC .... F02D 41/1454; F02D 41/20; F02D 41/221; F02D 41/26; F02D 41/38; F02D 2041/2003; F02D 2041/2013; F02D 2041/2027; F02D 2041/2034; F02D 2041/2041; F02D 2041/2058

USPC .......................... 701/104; 123/480, 488, 490
See application file for complete search history.

(56) References Cited

U.S. PATENT DOCUMENTS

| | | | | |
|---|---|---|---|---|
| 10,280,864 | B2* | 5/2019 | Yanoto | F02D 41/401 |
| 2002/0189593 | A1* | 12/2002 | Yamakado | F02D 41/20 123/490 |
| 2015/0114099 | A1* | 4/2015 | Qiao | F02D 41/20 73/114.49 |
| 2016/0319763 | A1* | 11/2016 | Shen | F02D 41/20 |
| 2017/0009697 | A1* | 1/2017 | Anetsberger | F02M 63/023 |
| 2020/0284214 | A1 | 9/2020 | Inaba et al. | |

FOREIGN PATENT DOCUMENTS

JP 2016-033343 A 3/2016

OTHER PUBLICATIONS

U.S. Appl. No. 17/333,126, filed May 28, 2021, Kato et al.
U.S. Appl. No. 17/333,207, filed May 28, 2021, Kato et al.

* cited by examiner

*Primary Examiner* — Erick R Solis
(74) *Attorney, Agent, or Firm* — Posz Law Group, PLC

(57) ABSTRACT

An injection control device includes: a fuel injection quantity command value output unit that outputs a command value for a fuel injection quantity of a fuel injection valve; and a controller that executes current control on the fuel injection valve. The controller executes current area correction by calculating an area correction amount for an energization time to cause an integrated current value of an energization current profile and the integrated current value of a current to be equal to each other. Correction control of the current area correction is changed based on a detection signal of a cooling water temperature of an internal combustion engine.

5 Claims, 3 Drawing Sheets

INJECTION CONTROL DEVICE

CROSS REFERENCE TO RELATED APPLICATION

The present application claims the benefit of priority from Japanese Patent Application No. 2020-111599 filed on Jun. 29, 2020. The entire disclosure of the above application is incorporated herein by reference.

TECHNICAL FIELD

The present disclosure relates to an injection control device that controls fuel injection to an internal combustion engine by current-driving a fuel injection valve.

BACKGROUND

In a comparative example, an injection control device is used to inject fuel into an internal combustion engine, such as an automobile engine, by opening and closing a fuel injection valve which is called an injector. The injection control device opens the fuel injection valve that is electrically drivable by passing current to the fuel injection valve. In recent years, due to tightening of PN regulations, micro-injection, that is, partial-lift injection has been frequently used. A high injection accuracy is required to improve fuel efficiency and reduce the amount of harmful substance emission. Thus, valve opening control is executed in such a manner that an energization current profile corresponding to a command injection quantity is set, and the injection control device supplies current to the fuel injection valve on the basis of the energization current profile.

SUMMARY

An injection control device includes: a fuel injection quantity command value output unit that outputs a command value for a fuel injection quantity of a fuel injection valve; a controller that executes current control on the fuel injection valve. The controller executes current area correction by calculating an area correction amount for an energization time to cause an integrated current value of an energization current profile and the integrated current value of a current to be equal to each other. Correction control of the current area correction is changed based on a detection signal of a cooling water temperature of an internal combustion engine.

DETAILED DESCRIPTION

Figure 1:
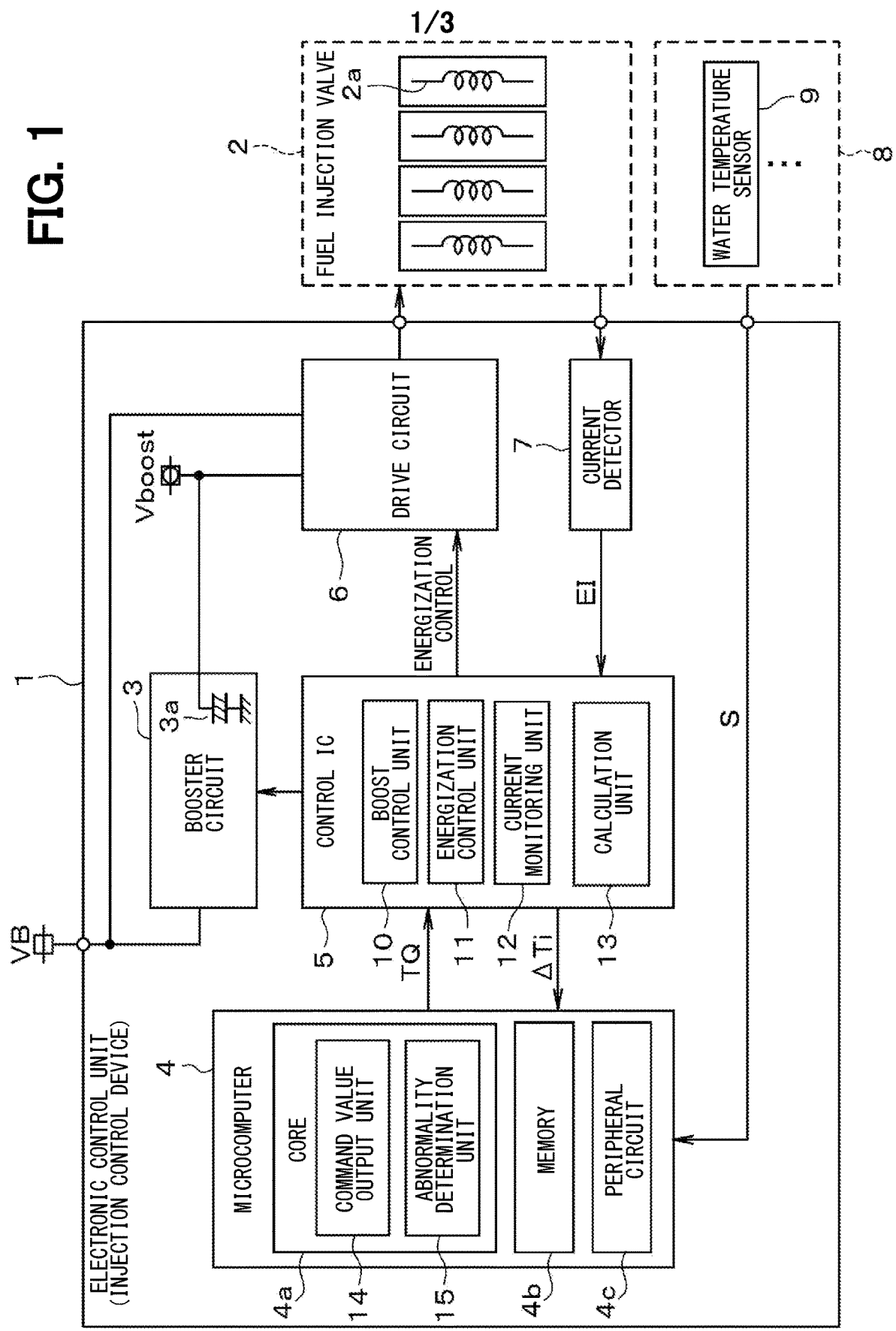
FIG. 1 is a block diagram illustrating an electrical configuration of an injection control device according to an embodiment.

In controlling a fuel injection valve, the gradient of an energization current of the fuel injection valve may become lower than the gradient of an energization current profile due to various factors such as a peripheral temperature environment and aged deterioration, and an actual injection quantity may thus become lower from a command injection quantity. Since the fuel injection quantity is obtained corresponding to an integrated value of the energization current, in a comparative example technique, current area correction is executed in such a manner that the gradient of the energization current is detected by monitoring the current at driving of the fuel injection valve and an energization time is extended according to the detected gradient.

When current area correction is executed in an energization control of the fuel injection valve, it is desirable to set, as an abnormality determination value, an upper limit of an area correction amount in order to prevent the area correction amount, that is, the energization time from becoming abnormally large. In this case, when the abnormality determination value is set to a fixed value, the gradient of the energization current fluctuates due to the peripheral environment. Therefore, an appropriate control may not always be executed. According to the research by the inventors, it was found that, when a peripheral environment temperature, particularly, a temperature of a solenoid coil of the fuel injection valve is relatively small, and the gradient of the energization current is relatively large, that is, becomes the gradient close to an energization current profile. Furthermore, it was found that, when the temperature of the solenoid of the fuel injection valve becomes relatively high, the gradient of the energization current becomes relatively gentle, that is, the deviation from the energization current profile becomes large.

Therefore, one example of the present disclosure provides an injection control device that executes current area correction based on an integrated value of an energization current in a normalization control of a fuel injection valve and is capable of executing an appropriate control according to a peripheral environment temperature.

According to one example embodiment, an injection control device controls fuel injection by current-driving a fuel injection valve that supplies fuel to an internal combustion engine. The injection control device includes: a fuel injection quantity command value output unit that outputs a command value for a fuel injection quantity of the fuel injection valve; and a controller that executes current control on the fuel injection valve on the basis of an energization current profile indicating a relationship between an energization time and an energization current value for obtaining an energization current integrated value corresponding to the fuel injection quantity command value. The controller executes current area correction by calculating, based on a difference between an integrated current value of the energization current profile and an integrated current value of a current that flows through the fuel injection valve and is detected by a current detector, an area correction amount for the energization time to cause the integrated current value of the energization current profile and the integrated current value of the current to be equal to each other. Correction control of the current area correction is changed based on a detection signal of a cooling water temperature of the internal combustion engine.

According to the above configuration, in executing current control on the fuel injection valve, the controller executes the current area correction by calculating, on the basis of a difference between an integrated current value of the energization current profile and an integrated current value of the current that flows through the fuel injection valve and is detected by the current detector, the area correction amount for the energization time so that the integrated current values become equal to each other. In this case, typically, the gradient of the actual current value detected by the current detector is deviated from an ideal gradient of the energization current indicated by the energization current profile in a decreasing direction. Therefore, by executing the current area correction described above, it is possible to obtain the energization current integrated value for the fuel injection valve according to the fuel injection amount command value, and thus the appropriate injection amount.

According to the research by the inventors, it was found that, when a control including the above-described current area correction for the fuel injection valve of the internal combustion engine is executed, the gradient of the actual current value detected by the current detector fluctuates according to the peripheral environment temperature, particularly, the temperature of the solenoid coil of the fuel injection valve. Then, there is a proportional relation between the temperature of the solenoid coil and a cooling water temperature of the internal combustion engine, and the fluctuation of the cooling water temperature of the internal combustion engine substantially coincides with the temperature fluctuation of the solenoid coil. Therefore, based on the detection signal of the cooling water temperature of the internal combustion engine, it is possible to more precisely and appropriately execute control by changing the correction control of the current area correction. Accordingly, it is possible to obtain an excellent effect of executing the appropriate control according to the peripheral environment in a case of executing current area correction based on an integrated value of an energization current in an energization control of a fuel injection valve.

Hereinafter, an embodiment applied to direct-injection control for an automobile gasoline engine as an internal combustion engine will be described with reference to the drawings. An electronic control unit 1 serving as an injection control device according to the present embodiment is called an ECU and controls fuel injection of a fuel injection valve 2 mounted on each cylinder of an engine as illustrated in FIG. 1. The fuel injection valve 2 is also called an injector. The fuel injection valve 2 directly injects fuel into the corresponding cylinder of the engine by energizing a solenoid coil 2a to drive a needle valve. FIG. 1 illustrates an example of a four-cylinder engine. However, the present disclosure can also be applied to, for example, a three-cylinder engine, a six-cylinder engine, or an eight-cylinder engine. Alternatively, the present disclosure may also be applied to an injection control device for a diesel engine.

As illustrated in FIG. 1, the electronic control unit 1 has an electrical configuration including a booster circuit 3, a microcomputer 4, a control IC 5, a drive circuit 6, and a current detector 7. The microcomputer 4 includes one or more cores 4a, a memory 4b such as a ROM and a RAM, and a peripheral circuit 4c such as an A/D converter. Sensor signals S from various sensors 8 for detecting the operating state of the engine are input to the microcomputer 4. As described later, the microcomputer 4 obtains a command value for a fuel injection quantity on the basis of, for example, a program stored in the memory 4b and the sensor signals S acquired from the various sensors 8. The control IC 5 may be also referred to as a controller 5.

At this time, the various sensors 8 include a water temperature sensor 9 which detects a temperature of cooling water of the engine. Although not illustrated, in addition to the water temperature sensor 9, the various sensors 8 include, for example, an A/F sensor which detects an air-fuel ratio of gas, a crank angle sensor which detects a crank angle of the engine, an air flow meter which detects the amount of intake air of the engine, a fuel pressure sensor which detects the pressure of fuel injected into the engine, and a throttle opening sensor which detects a throttle opening. FIG. 1 illustrates the sensors 8 in a simplified manner.

A core 4a of the microcomputer 4 implements functions of a fuel injection quantity command value output unit 14 and an area correction abnormality determination unit 15. Among these units, the fuel injection quantity command value output unit 14 grasps an engine load from the sensor signals S of the various sensors 8, calculates a fuel injection quantity required for the fuel injection valve 2 on the basis of the engine load, and outputs, to the control IC 5, the calculated fuel injection quantity as a fuel injection quantity command value TQ together with injection start instruction time t0. In FIG. 1, the fuel injection quantity command value output unit 14 may be referred to as "COMMAND VALUE OUTPUT UNIT", and the rea correction abnormality determination unit 15 may be referred to as "ABNORMALITY DETERMINATION UNIT". At this time, although the specific description is omitted, an A/F correction amount is calculated so that the air-fuel ratio is equal to the target air-fuel ratio based on the air-fuel ratio detected by the A/F sensor, an air-fuel ratio feedback control is executed. Further, A/F learning is executed based on a history of the A/F correction, and the learning correction value is added to, in other words, used for calculation of the A/F correction amount. Details of the area correction abnormality determination unit 15 will be described later.

The control IC 5 is an integrated circuit device such as an ASIC. Although not illustrated, the control IC 5 includes, for example, a logic circuit, a control main body such as a CPU, a storage unit such as a RAM, a ROM, or an EEPROM, and a comparison unit such as a comparator. The control IC 5 executes, for example, current control on the fuel injection valve 2 through the drive circuit 6 using hardware and software configurations thereof. At this time, as described below, the control IC 5 has functions of a boost control unit 10, an energization control unit 11, a current monitoring unit 12, and an area correction amount calculation unit 13.

Although not illustrated in detail, a battery voltage VB is input to the booster circuit 3, and the booster circuit 3 boosts the battery voltage VB and charge a booster capacitor 3a serving as a charging unit with boost voltage Vboost. At this time, the boost control unit 10 controls the operation of the booster circuit 3 to boost the input battery voltage VB and charges the booster capacitor 3a with the boost voltage Vboost up to a full charge voltage. The boost voltage Vboost is supplied to the drive circuit 6 as power for driving the fuel injection valve 2.

The battery voltage VB and the boost voltage Vboost are input to the drive circuit 6. Although not illustrated, the drive circuit 6 includes, for example, a transistor for applying the boost voltage Vboost to the solenoid coil 2a of the fuel injection valve 2 of each cylinder, a transistor for applying the battery voltage VB to the solenoid coil 2a, and a cylinder selection transistor which selects the cylinder to be energized. At this time, each of the transistors of the drive circuit 6 is on/off-controlled by the energization control unit 11. Accordingly, the drive circuit 6 drives the fuel injection valve 2 by applying the voltage to the solenoid coil 2a in accordance with energization control of the energization control unit 11.

The current detector 7 includes, for example, a current detection resistor (not illustrated) and detects a current flowing through the solenoid coil 2a. The current monitoring unit 12 of the control IC 5 includes, for example, a comparator and an A/D converter (both of which are not illustrated). The current monitoring unit 12 monitors, through the current detector 7, an energization current value EI which is a value of the current actually flowing through the solenoid coil 2a of the fuel injection valve 2 of each cylinder.

An energization current profile PI is stored in the control IC 5. The energization current profile PI indicates an ideal relationship between an energization time Ti and the energization current value for obtaining an energization current integrated value of the fuel injection valve 2 corresponding to the fuel injection quantity command value TQ. The energization control unit 11 of the control IC 5 executes current control on the fuel injection valve 2 through the drive circuit 6 on the basis of the energization current profile PI. At this time, in controlling the fuel injection valve 2, the gradient of the energization current of the fuel injection valve 2 may become lower than the gradient of the energization current profile PI due to various factors such as a peripheral temperature environment and aged deterioration, and an actual injection quantity may thus become lower than the command injection quantity. On the other hand, in controlling energization of the fuel injection valve 2, a fuel injection quantity corresponding to, that is, proportional to the integrated value of the energization current.

Thus, the energization control unit 11 executes, on the basis of the difference between an integrated current value of the energization current profile PI and an integrated current value of the energization current value EI, which is the value of the current actually flowing through the fuel injection valve 2, detected by the current detector 7, current area correction by calculating an area correction amount ΔTi for the energization time so as to make the integrated current values equal to each other. Current area correction control executed by the energization control unit 11 of the control IC 5 at partial-lift injection of the fuel injection valve 2 will be briefly described with reference to FIG. 2.

In the control based on the energization current profile PI, when energization is started at ON timing t0, the energization current gradually increases in a slight curve and reaches a peak current Ipk at time ta through energization for the energization time Ti, and a fuel injection quantity corresponding to the fuel injection quantity command value TQ is obtained. However, the actual energization current value EI of the fuel injection valve 2 increases in a curve with a gentler gradient than the curve in the energization current profile PI and reaches a current value lower than the peak current Ipk at the time ta. Thus, there is a shortage of the fuel injection quantity by a quantity corresponding to the difference between the integrated current value of the energization current profile PI and the integrated current value of the energization current value EI, in other words, the area in the graph between the curve of the energization current profile PI and the curve of the energization current value EI from the time t0 to the time ta in FIG. 2, that is, an area difference A1.

In the current area correction control, the area correction amount calculation unit 13 calculates an area correction amount ΔTi for the energization time. The area correction amount ΔTi is determined so that the integrated current value of the energization current profile PI and the integrated current value of the energization current value EI become equal to each other, that is, the area difference A1 and an area A2 in FIG. 2 become equal to each other. Then, the energization control unit 11 corrects, that is, extends the energization time using the calculated area correction amount ΔTi, thereby compensating for the shortage of the fuel injection quantity described above.

For example, the following method can be used as a method for calculating the area correction amount ΔTi. First, time t1n to reach a first current threshold I1 and time t2n to reach a second current threshold I2 for the energization current profile PI, and time t1 to reach the first current threshold I1 and time t2 to reach the second current threshold I2 for the energization current value EI are obtained. Then, the area difference A1 is estimated from these time values, and the area correction amount ΔTi for obtaining the area A2 equal to the area difference A1 is calculated. An appropriate fuel injection quantity of the fuel injection valve 2 corresponding to the fuel injection quantity command value TQ can be obtained by executing such current area correction control. As illustrated in FIG. 1, the area correction amount ΔTi is input to the microcomputer 4 from the area correction amount calculation unit 13.

As described above, the microcomputer 4 has the function of the area correction abnormality determination unit 15 which determines that an area correction abnormality is present when the area correction amount ΔTi is equal to or larger than an abnormality determination value TML. When the area correction abnormality determination unit 15 determines that an area correction abnormality is present, the microcomputer 4 outputs a current area correction stop command to the control IC 5 to stop the current area correction. At this time, in the present embodiment, the area correction abnormality determination unit 15 changes the abnormality determination value TML on the basis of a cooling water temperature detection signal by the water temperature sensor 9. The change of the abnormality determination value TML corresponds to the change of the correction control of the current area correction.

Figure 3:
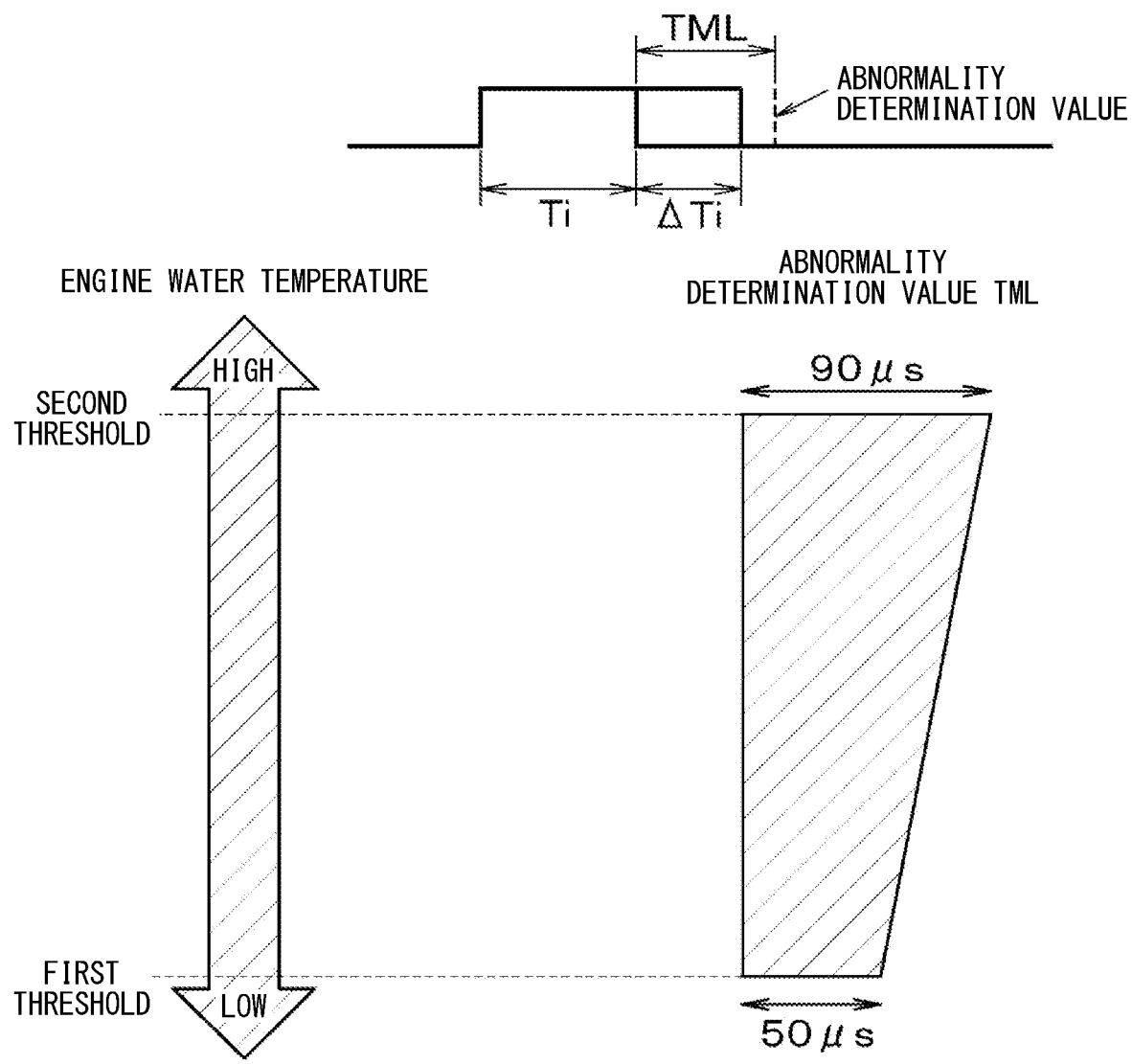
FIG. 3 is a diagram illustrating a relationship between a cooling water temperature of an engine and an abnormality determination value.

FIG. 3 illustrates a concrete example of the relationship between the cooling water temperature detected by the water temperature sensor 9 and the abnormality determination value TML. Here, as illustrated in FIG. 3, when the cooling water temperature detected by the water temperature sensor 9 is less than, for example, 0° C. as a first threshold, the abnormality determination value TML is set to, for example, 50 μs as a predetermined lower limit. When the cooling water temperature detected by the water temperature sensor 9 is equal to or more than, for example, 100° C. as a second threshold, the abnormality determination value TML is set to, for example, 90 μs as a predetermined upper limit. When the cooling water temperature is equal to or more than the first threshold and also less than the second threshold, as the cooling water temperature increases, the abnormality determination value TML is changed so as to linearly increase from the lower limit to the upper limit.

Figure 2:
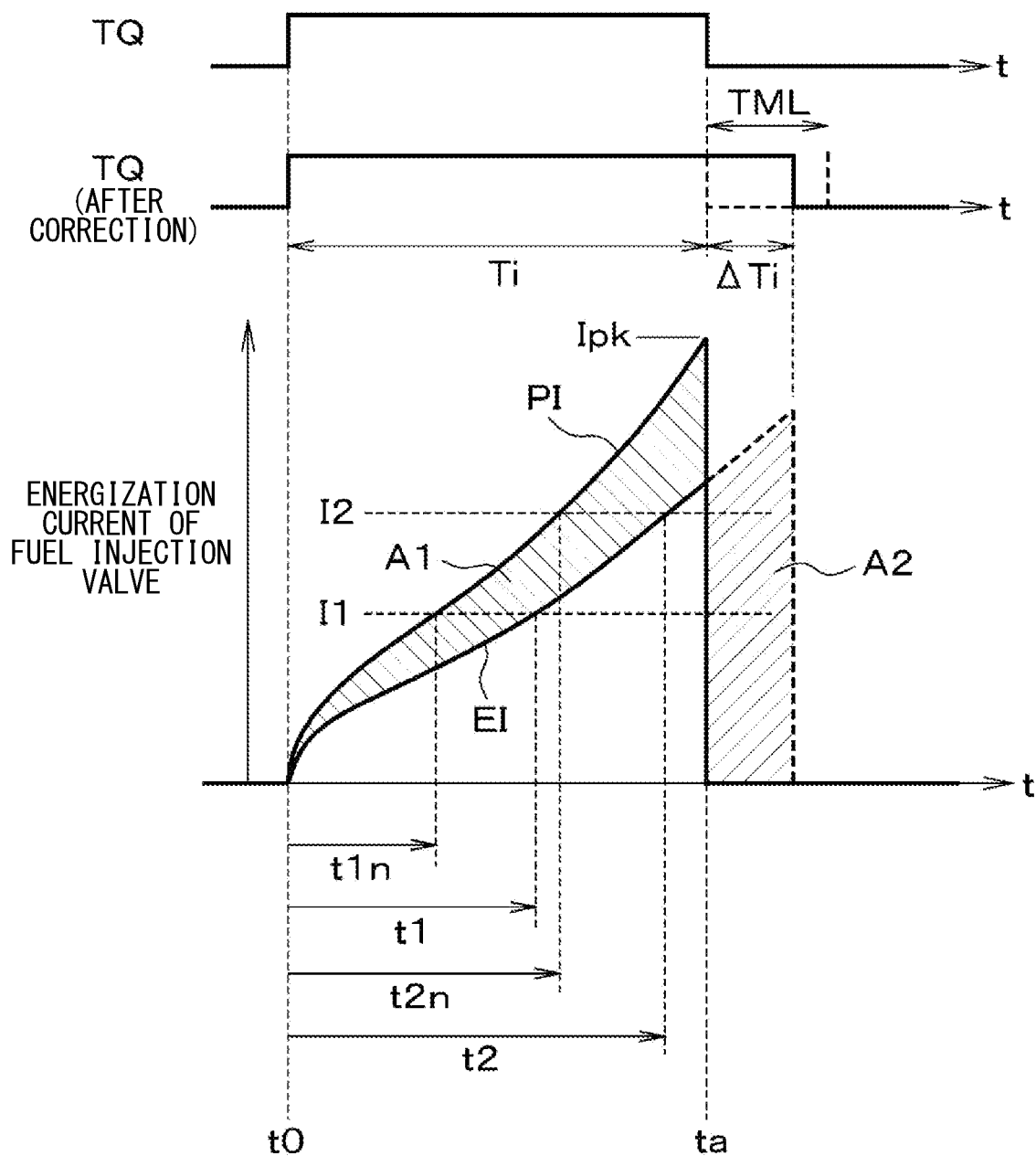
FIG. 2 is a diagram, for describing current area correction control, illustrating the relationship between an energization time and an energization current of a fuel injection valve.

Next, actions and effects in the electronic control unit 1 configured in the above manner will be described. The electronic control unit 1 having the above configuration executes the current area correction control using the fact that the fuel injection quantity corresponding to the integrated value of the energization current of the fuel injection valve 2 can be obtained, in current control on the fuel injection valve 2 executed by the microcomputer 4 and the control IC 5. As illustrated in FIG. 2, in the current area correction control, the current area correction is executed by calculating, on the basis of the difference between the integrated current value of the energization current profile PI and the integrated current value of the energization current value EI, which is the value of the current that flows through the fuel injection valve 2 and is detected by the current detector 7, an area correction amount ΔTi for the energization time so that the integrated current values become equal to each other.

In this case, typically, the gradient of the actual current value EI detected by the current detector 7 is deviated from an ideal gradient of the energization current indicated by the energization current profile PI in a decreasing direction. Thus, the current area correction as described above makes it possible to compensate for the shortage of the actual energization current integrated value, that is, the fuel injection quantity of the fuel injection valve 2 corresponding to the fuel injection quantity command value TQ and thus obtain an appropriate fuel injection quantity. In the present embodiment, the area correction abnormality determination unit 15 makes it possible to determine that an area correction abnormality is present when the area correction amount ΔTi is equal to or larger than the abnormality determination value TML.

Here, according to the research by the inventors, when a control including the above-described current area correction for the fuel injection valve 2 of the engine is executed, the gradient of the actual energization current value EI detected by the current detector 7 fluctuates according to the peripheral environment temperature, particularly, the temperature of the solenoid coil 2a of the fuel injection valve 2. Specifically, when the peripheral environment temperature is relatively low, the gradient of the energization current value EI relatively increases, and becomes the gradient close to the energization current profile PI. On the other hand, when the peripheral environment temperature is high, the gradient of the energization current value EI is relatively small, and the deviation from the energization current profile PI becomes large.

Therefore, in a case of determining the area correction abnormality of the area correction amount ΔTi as described above, if the abnormality determination value TML is set to a fixed value, appropriate control may not be always executed. For example, when the gradient of the energization current value EI is relatively high, that is, close to the energization current profile PI, the abnormality determination value is not reached unless the area correction amount ΔTi becomes considerably large. Thus, the overcorrection may be executed. On the contrary, when the gradient of the energization current value EI is relatively gentle, that is, separated from the energization current profile PI, the state may be frequently determined as abnormal.

However, in the present embodiment, the area correction abnormality determination unit 15 changes the abnormality determination value TML on the basis of a cooling water temperature detection signal by the water temperature sensor 9. The change of the abnormality determination value TML corresponds to the change of the correction control of the current area correction. Then, there is a proportional relation between the temperature of the solenoid coil 2a of the fuel injection valve 2 and a cooling water temperature of the engine, and the fluctuation of the cooling water temperature of the engine substantially coincides with the temperature fluctuation of the solenoid coil 2a. Thereby, based on the temperature detected by the water temperature sensor 9, it is possible to more precisely and appropriately execute control by changing the correction control of the current area correction. According to the present embodiment, it is possible to obtain an excellent effect of executing the appropriate control according to the peripheral environment in a case of executing current area correction based on an integrated value of an energization current in an energization control of the fuel injection valve 2.

Particularly, in the present embodiment, as illustrated in FIG. 3, the area correction abnormality determination unit 15 changes the abnormality determination value TML of the area correction amount ΔTi on the basis of a cooling water temperature detection signal by the water temperature sensor 9. The change of the abnormality determination value TML corresponds to the change of the control of the current area correction. Thereby, it is possible to more precisely and appropriately determine the area correction abnormality in accordance with the cooling water temperature of the engine or the temperature of the fuel injection valve 2.

Then, specifically, when the cooling water temperature is less than the first threshold, for example, 0° C., the abnormality determination value TML is set to 50 μs that is the predetermined lower limit. When the cooling water temperature is equal to or more than the first threshold and also less than the second threshold, for example, 100° C., as the cooling water temperature increases, the abnormality determination value TML is changed so as to gradually increase from the lower limit value. Thereby, in a case where the cooling water temperature is lower than the first threshold, the gradient of the energization current value EI becomes relatively high. Therefore, the area correction amount ΔTi is relatively small in the normal state. Accordingly, by setting the abnormality determination value TML to the predetermined lower limit value, it is possible to determine the abnormality with sufficient certainty at an early timing, and preliminarily prevent the excessive area correction from being executed.

On the other hand, when the cooling water temperature is equal to or more than the first threshold and also less than the second threshold, that is, the cooling water temperature is relatively high, the gradient of the energization current value EI is relatively small. Therefore, it is assumed that the area correction amount ΔTi becomes relatively high even in normal state, that is, the non-abnormal state. As described above, it is predicted that the area correction amount ΔTi increases as the cooling water temperature increases. Accordingly, when the cooling water temperature is equal to or more than the first threshold and relatively high, as the cooling water temperature increases, the abnormality determination value TML is changed so as to gradually increase from the lower limit value. Thereby, it is unnecessary to advance the timing of determining the area abnormality, and it is possible to preliminarily prevent the abnormality from being inaccurately determined at an early timing.

Further, then, when the cooling water temperature is equal to or higher than the second threshold, for example, 100° C., the abnormality determination value TML is set to the predetermined upper limit value, for example, 90 μs. Thereby, by setting the appropriate upper limit value, the abnormality determination value TML does not become unnecessarily large, and it is possible to prevent the timing of determining the abnormality from being excessively delayed.

In executing the area correction control on the fuel injection valve 2, the above embodiment employs a relatively simple method in which the time t1n to reach the first current threshold I1 and the time t2n to reach the second current threshold I2 for the energization current profile PI, and the time t1 to reach the first current threshold I1 and the time t2 to reach the second current threshold I2 for the actual energization current value EI are obtained, and the area difference A1 is then estimated from these time values. However, the area correction amount ΔTi may be obtained by employing other various methods. In the above embodiment, the abnormality determination value TML is linearly changed from the lower limit value to the upper limit value. However, the abnormality determination value TML may be changed in two or more stages.

The microcomputer 4 and the control IC 5 described above may be integrated with each other. In this case, it is desirable to use an arithmetic processor capable of executing a high-speed operation. The means and the functions provided by the microcomputer 4 and the control IC 5 can be provided by software recorded in a substantive memory device and a computer executing the software, software only, hardware only, or a combination thereof. For example, when the control device is provided by an electronic circuit as hardware, the control device can include a digital circuit including one or more logic circuits or an analog circuit. Further, for example, when the control device executes various control operations using software, a program is stored in the storage unit, and the control main body executes the program to implement a method corresponding to the program.

In addition, the hardware configuration such as the fuel injection valve, the booster circuit, the drive circuit, and the current detector can be variously modified. The present disclosure has been described in accordance with the embodiment. However, it is to be understood that the present disclosure is not limited to the embodiment and structure. The present disclosure also encompasses various modifications and variations within an equivalent range. In addition, various combinations and modes, as well as other combinations and modes including only one element, more, or less, are within the scope and idea of the present disclosure.

The controller (control unit) and the method described in the present disclosure may be implemented by a dedicated computer including a processor programmed to execute one or more functions embodied by a computer program and a memory. Alternatively, the controller and method described in the present disclosure may be implemented by a special purpose computer provided by configuring a processor with one or more dedicated hardware logic circuits. Alternatively, the controller and method described in the present disclosure may be implemented by one or more special purpose computers configured by combining a memory and a processor programmed to execute one or more functions with one or more dedicated hardware logic circuits. The computer program may be stored, as an instruction executed by a computer, in a computer-readable non-transitory tangible storage medium.

The invention claimed is:

1. An injection control device configured to control fuel injection by current-driving a fuel injection valve configured to supply fuel to an internal combustion engine, the injection control device comprising:
   a fuel injection quantity command value output unit configured to output a command value for a fuel injection quantity of the fuel injection valve; and
   a controller configured to execute current control on the fuel injection valve based on an energization current profile indicating a relationship between an energization time and an energization current value for obtaining an energization current integrated value corresponding to the fuel injection quantity command value,
   wherein:
   the controller is configured to execute current area correction by calculating, based on a difference between an integrated current value of the energization current profile and an integrated current value of a current that flows through the fuel injection valve and is detected by a current detector, an area correction amount for the energization time to cause the integrated current value of the energization current profile and the integrated current value of a current to be equal to each other; and
   correction control of the current area correction is changed based on a detection signal of a cooling water temperature of the internal combustion engine.

2. The injection control device according to claim 1, further comprising:
   an area correction abnormality determination unit configured to determine that an area correction abnormality is present when the area correction amount is equal to or larger than an abnormality determination value,
   wherein:
   when changing the correction control of the current area correction, the area correction abnormality determination unit changes the abnormality determination value based on a detection signal of the cooling water temperature.

3. The injection control device according to claim 2, wherein:
   when the cooling water temperature is less than a first threshold, the area correction abnormality determination unit sets the abnormality determination value to a predetermined lower limit; and
   when the cooling water temperature is equal to or more than the first threshold and less than a second threshold, the area correction abnormality determination unit changes the abnormality determination value to gradually increase from a lower limit value as the cooling water temperature increases.

4. The injection control device according to claim 3, wherein:
   the area correction abnormality determination unit sets the abnormality determination value to a predetermined upper limit value when the cooling water temperature is equal to or more than the second threshold.

5. An injection control device comprising:
   a processor; and
   a memory that stores an instruction configured to, when executed by the processor, cause the processor to:
   control fuel injection by current-driving a fuel injection valve configured to supply fuel to an internal combustion engine;
   output a command value for a fuel injection quantity of the fuel injection valve;
   execute current control on the fuel injection valve based on an energization current profile indicating a relationship between an energization time and an energization current value for obtaining an energization current integrated value corresponding to the fuel injection quantity command value;
   execute current area correction by calculating, based on a difference between an integrated current value of the energization current profile and an integrated current value of a current that flows through the fuel injection valve and is detected by a current detector, an area correction amount for the energization time to cause the integrated current value of the energization current profile and the integrated current value of a current to be equal to each other; and
   change correction control of the current area correction based on a detection signal of a cooling water temperature of the internal combustion engine.

* * * * *